United States Patent
Wang et al.

(10) Patent No.: US 12,373,954 B2
(45) Date of Patent: Jul. 29, 2025

(54) TRANSFORMER FOR EFFICIENT IMAGE SEGMENTATION

(71) Applicant: ADOBE INC., San Jose, CA (US)

(72) Inventors: Yilin Wang, Sunnyvale, CA (US); Chenglin Yang, Towson, MD (US); Jianming Zhang, Fremont, CA (US); He Zhang, Santa Clara, CA (US); Zijun Wei, San Jose, CA (US); Zhe Lin, Clyde Hill, WA (US)

(73) Assignee: ADOBE INC., San Jose, CA (US)

( * ) Notice: Subject to any disclaimer, the term of this patent is extended or adjusted under 35 U.S.C. 154(b) by 449 days.

(21) Appl. No.: 17/806,312

(22) Filed: Jun. 10, 2022

(65) Prior Publication Data

US 2023/0401716 A1    Dec. 14, 2023

(51) Int. Cl.
*G06T 7/10*         (2017.01)
*G06T 11/60*        (2006.01)
*G06V 10/82*        (2022.01)

(52) U.S. Cl.
CPC .............. *G06T 7/10* (2017.01); *G06T 11/60* (2013.01); *G06V 10/82* (2022.01); *G06T 2207/20081* (2013.01)

(58) Field of Classification Search
None
See application file for complete search history.

(56) References Cited

U.S. PATENT DOCUMENTS

| | | | |
|---|---|---|---|
| 2020/0364871 A1* | 11/2020 | Bradski | G06T 11/203 |
| 2021/0026355 A1* | 1/2021 | Chen | G05D 1/0088 |
| 2021/0089807 A1 | 3/2021 | Liu et al. | |
| 2021/0110198 A1 | 4/2021 | Rhodes et al. | |
| 2021/0312192 A1* | 10/2021 | Chen | G06Q 10/0635 |
| 2022/0101489 A1 | 3/2022 | Nie et al. | |
| 2022/0391635 A1 | 12/2022 | Lian et al. | |
| 2023/0274404 A1* | 8/2023 | George | G06T 7/11 |
| | | | 382/109 |

OTHER PUBLICATIONS

Li, R.—"Multi-Attention-Network for Semantic Segmentation of Fine-Resolution Remote Sensing Images"—IEEE—Jul. 2021—pp. 1-14 (Year: 2021).*
Dosovitskiy, et al. "An Image is Worth 16×16 Words: Transformers for Image Recognition at Scale", arXiv preprint arXiv:2010.11929, 2020, 22 Pages.
Kirillov, et al., "Panoptic Feature Pyramid Networks", In Proceedings of the IEEE/CVF Conference on Computer Vision and Pattern Recognition, pp. 6399-6408, 2019.

(Continued)

*Primary Examiner* — Bernard Krasnic
(74) *Attorney, Agent, or Firm* — F. CHAU & ASSOCIATES, LLC

(57) ABSTRACT

Systems and methods for image segmentation are described. Embodiments of the present disclosure receive an image depicting an object; generate image features for the image by performing a convolutional self-attention operation that outputs a plurality of attention-weighted values for a convolutional kernel applied at a position of a sliding window on the image; and generate label data that identifies the object based on the image features.

18 Claims, 11 Drawing Sheets

(56) References Cited

OTHER PUBLICATIONS

Qiao, et al., "DetectoRS: Detecting Objects with Recursive Feature Pyramid and Switchable Atrous Convolution", In Proceedings of the IEEE/CVF Conference on Computer Vision and Pattern Recognition, pp. 10213-10224, 2021.
Sandler, et al., "MobileNetV2: Inverted Residuals and Linear Bottlenecks", In Proceedings of the IEEE conference on computer vision and pattern recognition, pp. 4510-4520, 2018.
Yuan, et al., "VOLO: Vision Outlooker for Visual Recognition", arXiv preprint arXiv:2106.13112, 2021, 12 pages.
Yang, et al., "Lite Vision Transformer with Enhanced Self-Attention", arXiv preprint arXiv:2112.10809v1 [cs.CV] Dec. 20, 2021, 11 pages.
Office Action dated Nov. 7, 2024 in related U.S. Appl. No. 17/806,314.
Chen, Liang-Chieh, et al., "Deeplab: Semantic image segmentation with deep convolutional nets, atrous convolution, and fully connected crfs." IEEE transactions on pattern analysis and machine intelligence 40.4 (2017): 834-848. (Apr. 2017).

\* cited by examiner

TRANSFORMER FOR EFFICIENT IMAGE SEGMENTATION

BACKGROUND

The following relates generally to image segmentation using machine learning. Image segmentation is an image processing task that partitions an image into segments based on the content of the image. Image segmentation tasks include semantic segmentation and instance segmentation. Semantic segmentation refers to the assignment of categories (e.g., vehicle, animal, etc.) to each pixel in an image. Instance segmentation refines semantic segmentation by differentiating between instances of each category.

A variety of machine learning techniques have been used for image segmentation. However, deep learning-based methods often involve high computation costs and depend on the availability of high-resolution input. As a result, these methods are not easily adopted in systems with limited computational complexity, such as mobile devices, or in situations where a high-resolution input is not available. Therefore, there is a need in the art for improved image segmentation systems that can provide accurate results with reduced computational costs or when using low-resolution input.

SUMMARY

The present disclosure describes systems and methods for image segmentation. Embodiments of the present disclosure include an image segmentation apparatus configured to generate label data that identifies an object of an image based on image features. A convolutional self-attention transformer block is configured to generate image features for an image by performing a convolutional self-attention operation. That is, a modified convolution procedure is performed where instead of generating a single value for each pass of the convolutional kernel, multiple values are produced that correspond to different relative positions within a sliding window (conventional convolution produces a single value at each position). Additionally, a set of optional recursive atrous self-attention transformer blocks is configured to generate image features for the image by performing an atrous self-attention operation based on a set of dilation rates. In some examples, the atrous self-attention operation relates to using convolution that includes a self-attention operation based on multiple dilation rates (i.e., different scales).

A method, apparatus, and non-transitory computer readable medium for image segmentation are described. One or more embodiments of the method, apparatus, and non-transitory computer readable medium include receiving an image depicting an object; generating image features for the image by performing a convolutional self-attention operation that outputs a plurality of attention-weighted values for a convolutional kernel applied at a position of a sliding window on the image; and generating label data that identifies the object based on the image features.

A method, apparatus, and non-transitory computer readable medium for image segmentation are described. One or more embodiments of the method, apparatus, and non-transitory computer readable medium include receiving training data including a training image and ground-truth label data; generating image features for the training image by performing a convolutional self-attention operation using a machine learning model, wherein the machine learning model generates a plurality of attention-weighted values for a convolutional kernel applied at a position of a sliding window on the training image; generating label data that identifies an object in the training image based on the image features; computing a loss function based on the generated label data and the ground-truth label data; and updating the machine learning model based on the loss function.

An apparatus and method for image segmentation are described. One or more embodiments of the apparatus and method include an encoder comprising a convolutional self-attention transformer block configured to generate image features for an image by performing a convolutional self-attention operation that outputs a plurality of attention-weighted values for a convolutional kernel applied at a position of a sliding window on the image and a decoder configured to generate label data that identifies an object of the image based on the image features.

DETAILED DESCRIPTION

Figure 1:
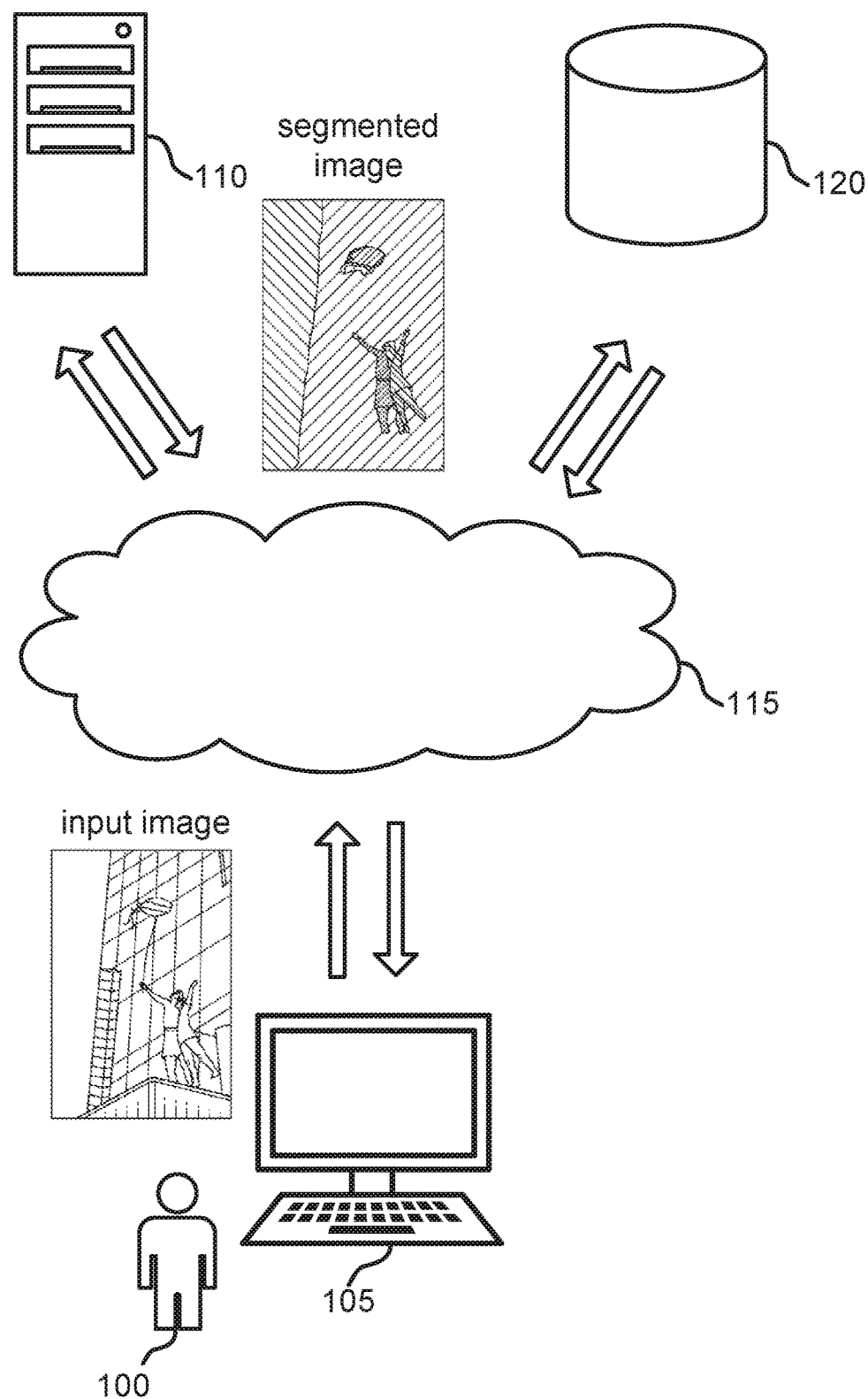
FIG. 1 shows an example of an image processing system according to aspects of the present disclosure.

The present disclosure describes systems and methods for image segmentation. Embodiments of the present disclosure include an image segmentation apparatus configured to generate label data that identifies an object of an image based on image features. A convolutional self-attention transformer block is configured to generate image features for an image by performing a convolutional self-attention operation. That is, a modified convolution procedure is performed where instead of generating a single value for each pass of the convolutional kernel, multiple values are produced that correspond to different relative positions within a sliding window (conventional convolution produces a single value at each position). Additionally, a set of optional recursive atrous self-attention transformer blocks is configured to generate image features for the image by performing an atrous self-attention operation based on a set of dilation rates. In some examples, the atrous self-attention operation relates to using convolution that includes a self-attention operation based on multiple dilation rates (i.e., different scales).

Image processing systems can perform classification, object localization, semantic segmentation, and instance-level segmentation. However, conventional systems require high resolution input to perform such operations on the images. Input resolution may be reduced to accelerate image processing tasks but reducing input resolution results in performance degradation. The computational complexity of deep-learning-based instance-level detection models can make the deep learning models unsuitable for use in real-world mobile applications such as image processing on mobile devices or robotic navigation. Conventional image segmentation systems may scale down model size (i.e., fewer model parameters) to be used on mobile applications. However, performance and prediction accuracy of these conventional systems are decreased due to limited representation capacity.

Embodiments of the present disclosure include an image segmentation apparatus configured to generate effective feature representation by performing a convolutional self-attention operation and an optional atrous self-attention. The image segmentation apparatus includes a convolutional self-attention transformer block configured to generate image features for an image by performing a convolutional self-attention operation that outputs a set of attention-weighted values for a convolutional kernel applied at a position of a sliding window on the image. In an embodiment, the image segmentation apparatus further includes an optional recursive atrous self-attention transformer block configured to generate image features for the image by performing an atrous self-attention operation based on a set of dilation rates for a convolutional kernel applied at a position of a sliding window on the image. In some examples, the image segmentation apparatus includes a set of recursive atrous self-attention transformer blocks.

According to at least one embodiment of the present disclosure, the image segmentation apparatus is configured to perform convolutional self-attention (CSA). CSA integrates local self-attention into the convolution kernel of size 3×3. Low-level features are processed and integrated using dynamic kernels and learnable filters. CSA is different from methods related to merging global self-attention with convolution. In some examples, conventional convolution receives input size 3×3, kernel size 3×3, and convolution output is a single value. That is, conventional convolution assigns a summed value to a center (i.e., center of the 3×3). Unlike conventional convolution, CSA receives input size 3×3 and CSA output is also 3×3 (e.g., 3×3 matrix). CSA updates 9 numbers based on neighboring values at each position of a window. That is, CSA performs 9 multiplications and adds them up to update a position (e.g., upper left corner).

In an embodiment, recursive atrous self-attention (RASA) includes atrous self-attention (ASA) and recursion. ASA captures the multi-scale context in the calculation of similarity map in self-attention. Recursive formulation with ASA works as the activation function. This way, RASA increases representation capacity (i.e., prediction accuracy) while maintaining fair computation cost. In some examples, a light-weight transformer backbone model has CSA operation at a first stage processing low-level features and RASA operation at the rest stages processing high-level features. The image segmentation apparatus based on CSA and RASA shows increased performance in at least ImageNet recognition, ADE20K semantic segmentation, and COCO panoptic segmentation. Accordingly, the image segmentation apparatus has high prediction accuracy with regards to image segmentation, relatively few parameters in size, and can be easily deployed on mobile devices or mobile platforms.

Embodiments of the present disclosure may be used in the context of image editing applications. For example, an image processing network based on the present disclosure may take an image and efficiently generate label data for user manipulation. An example application in the image segmentation context is provided with reference to FIG. 7. Details regarding the architecture of an example image segmentation apparatus are provided with reference to FIGS. 1-6. Example processes for image processing are provided with reference to FIGS. 8-10. An example training process is described with reference to FIG. 11.

Network Architecture

In FIGS. 1-6, an apparatus and method for image segmentation are described. One or more embodiments of the apparatus and method include an encoder comprising a convolutional self-attention transformer block configured to generate image features for an image by performing a convolutional self-attention operation that outputs a plurality of attention-weighted values for a convolutional kernel applied at a position of a sliding window on the image and a decoder configured to generate label data that identifies an object of the image based on the image features.

In some embodiments, the encoder further comprises a recursive atrous self-attention transformer block configured to perform an atrous self-attention operation based on a plurality of dilation rates for a convolution.

Some examples of the apparatus and method further include a training component configured to receive training data including the image and ground-truth label data, to compute a loss function based on the generated label data to the ground-truth label data, and to update a machine learning model based on the loss function. Some examples of the apparatus and method further include an image editing application configured to edit the image based on the label data.

FIG. 1 shows an example of an image processing system according to aspects of the present disclosure. The example shown includes user 100, user device 105, image segmentation apparatus 110, cloud 115, and database 120. Image segmentation apparatus 110 is an example of, or includes aspects of, the corresponding element described with reference to FIGS. 2 and 8.

As an example shown in FIG. 1, user 100 uploads an input image to image segmentation apparatus 110, e.g., via user device 105 and cloud 115. The input image depicts multiple objects of different categories such as person, background sky, a tall building behind the persons, and a kite. Image segmentation apparatus 110 generates image features for the input image by performing a convolutional self-attention operation that outputs a set of attention-weighted values for a convolutional kernel applied at a position of a sliding window on the image.

Image segmentation apparatus 110 generates label data that identifies the object based on the image features. For example, each instance of persons is identified using a unique shading pattern (i.e., distinguish a first person and a second person). Sky, the building, and the kite are identified using a respective label (e.g., shading pattern). A segmented image comprising label data is then returned to user 100, via cloud 115 and user device 105.

User device 105 may be a personal computer, laptop computer, mainframe computer, palmtop computer, personal assistant, mobile device, or any other suitable processing apparatus. In some examples, user device 105 includes software that incorporates an image processing application (e.g., an image editing application). In some examples, the image editing application on user device 105 may include functions of image segmentation apparatus 110. The image editing application is configured to edit an image based on label data (e.g., segmentation annotation data). The process of using image segmentation apparatus 110 is further described with reference to FIG. 7.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image segmentation apparatus 110 may also include a processor unit, a memory unit, an I/O module, and a training component. The training component is used to train a machine learning model (or an image segmentation network). Additionally, image segmentation apparatus 110 can communicate with database 120 via cloud 115. In some cases, the architecture of the image segmentation network is also referred to as a network or a network model. Further detail regarding the architecture of image segmentation apparatus 110 is provided with reference to FIGS. 2-6. Further detail regarding the operation of image segmentation apparatus 110 is provided with reference to FIGS. 8-10.

In some cases, image segmentation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
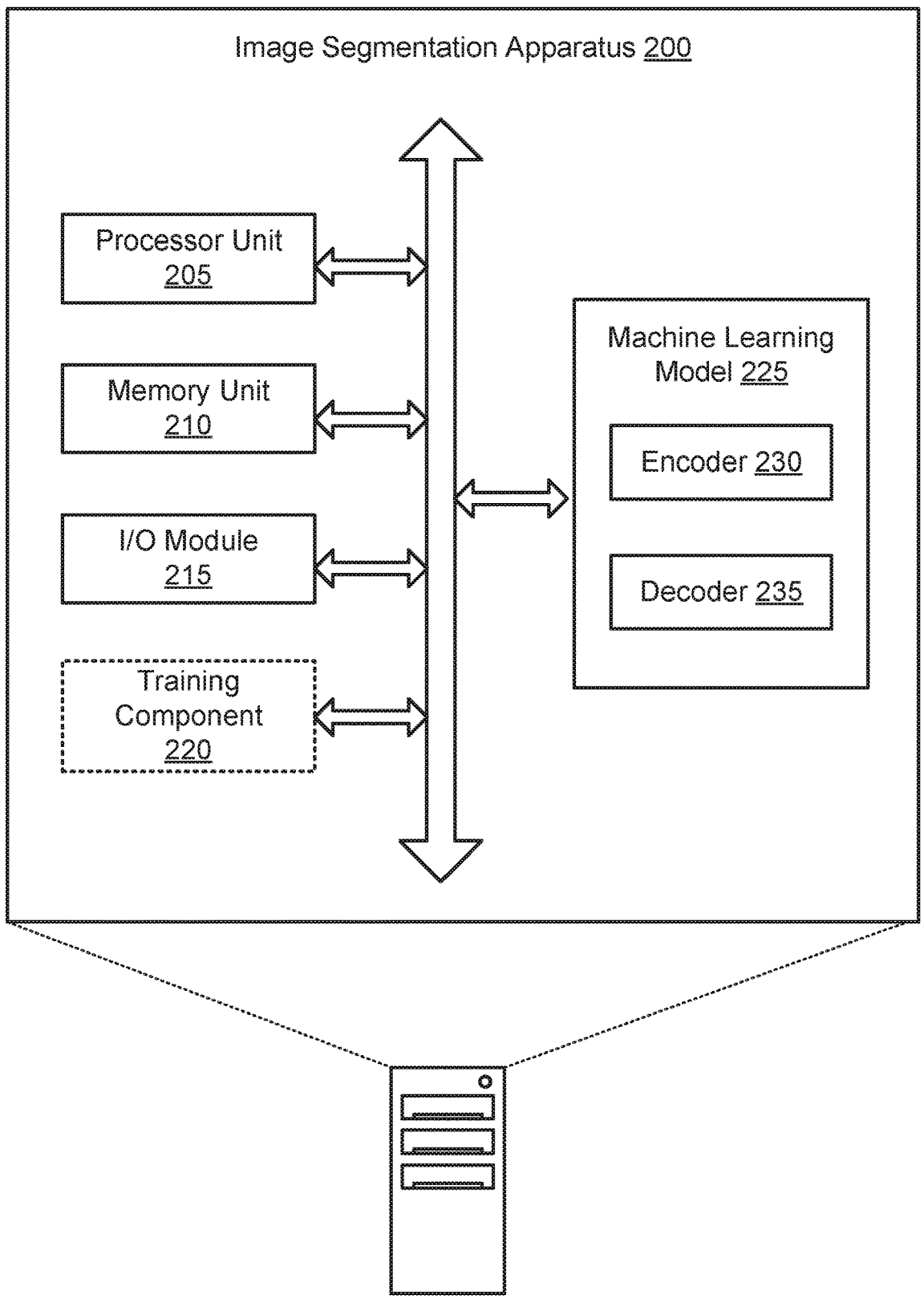
FIG. 2 shows an example of an image segmentation apparatus according to aspects of the present disclosure.

FIG. 2 shows an example of an image segmentation apparatus 200 according to aspects of the present disclosure. The example shown includes image segmentation apparatus 200, processor unit 205, memory unit 210, I/O module 215, training component 220, and machine learning model 225. Image segmentation apparatus 200 is an example of, or includes aspects of, the corresponding element described with reference to FIGS. 1 and 8. According to some embodiments, machine learning model 225 receives an image depicting an object. Machine learning model 225 includes encoder 230 and decoder 235.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image segmentation apparatus 200 includes a computer implemented artificial neural network (ANN) for generating image features for an image by performing a convolutional self-attention operation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image segmentation apparatus 200 includes a convolutional neural network (CNN) for image segmentation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 220 receives training data including the image and ground-truth label data. In some examples, training component 220 computes a loss function based on the generated label data to the ground-truth label data. Training component 220 updates a machine learning model 225 based on the loss function. In some examples, training component 220 is part of another apparatus other than image segmentation apparatus 200.

According to some embodiments, machine learning model 225 receives an image depicting an object. In some examples, machine learning model 225 partitions the image into a set of patches, where the image features are generated based on the set of patches. In some examples, machine learning model 225 performs a patch merging operation on the set of patches to obtain a set of merged patches, where the image features are generated based on the set of merged patches.

According to some embodiments, encoder 230 generates image features for the image by performing a convolutional self-attention operation that outputs a set of attention-weighted values for a convolutional kernel applied at a position of a sliding window on the image.

According to some embodiments, encoder 230 generates image features for the image by performing an atrous self-attention operation based on a set of dilation rates for a convolutional kernel applied at a position of a sliding window on the image.

According to some embodiments, encoder 230 comprising a convolutional self-attention transformer block configured to generate image features for an image by performing a convolutional self-attention operation that outputs a plurality of attention-weighted values for a convolutional kernel applied at a position of a sliding window on the image. In some embodiments, encoder 230 further includes a recursive atrous self-attention transformer block configured to generate image features for the image by performing an atrous self-attention operation based on a set of dilation rates for a convolutional kernel applied at a position of a sliding window on the image. In some examples, encoder 230 consists of a set of recursive atrous self-attention transformer blocks. Encoder 230 is an example of, or includes aspects of, the corresponding element described with reference to FIG. 3.

Figure 4:
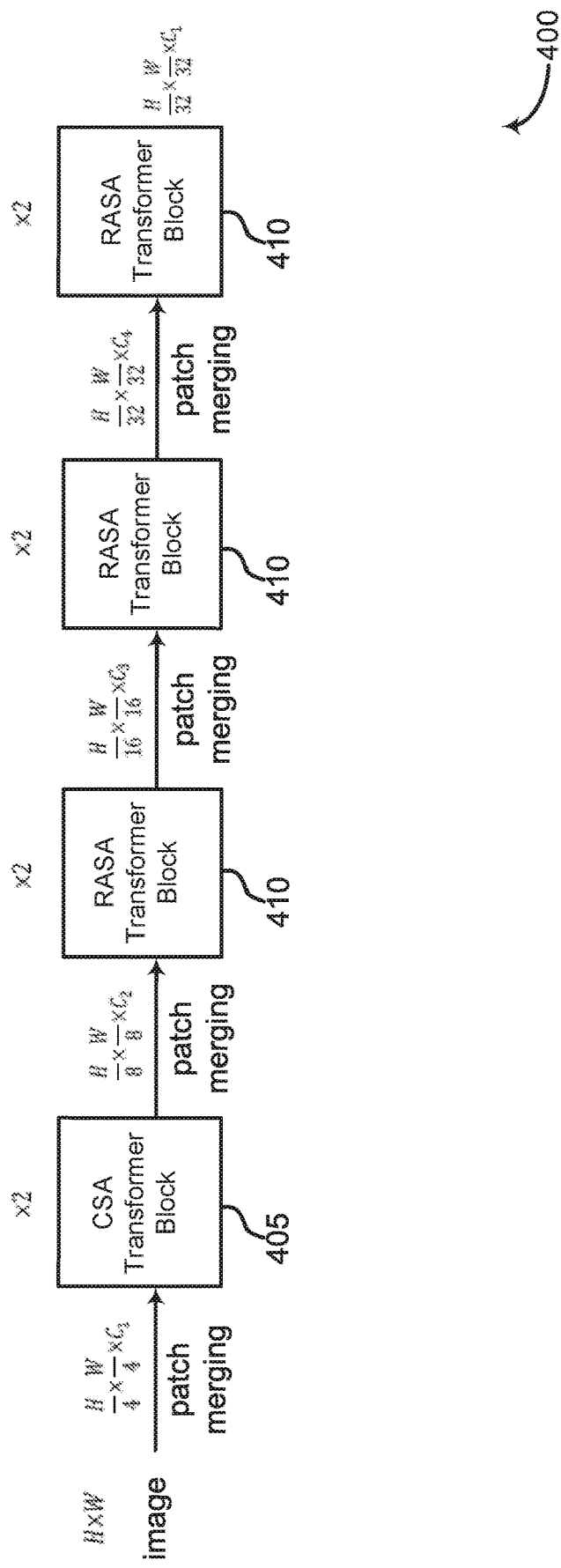
FIG. 4 shows an example of a transformer model according to aspects of the present disclosure.

According to some embodiments, encoder 230 includes a transformer model as shown in FIG. 4. A transformer or transformer network is a type of neural network models used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are all the values, which are again the vector representations of all the words in the sequence. For the encoder and decoder, multi-head attention modules, V consists of the same word sequence than Q. However, for the attention module that is taking into account the encoder and the decoder sequences, V is different from the sequence represented by Q. In some cases, values in V are multiplied and summed with some attention-weights a.

According to some embodiments, decoder 235 generates label data that identifies the object based on the image features. In some examples, decoder 235 decodes the image features to obtain panoptic segmentation data, where the label data includes the panoptic segmentation data. Decoder 235 is an example of, or includes aspects of, the corresponding element described with reference to FIG. 3.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
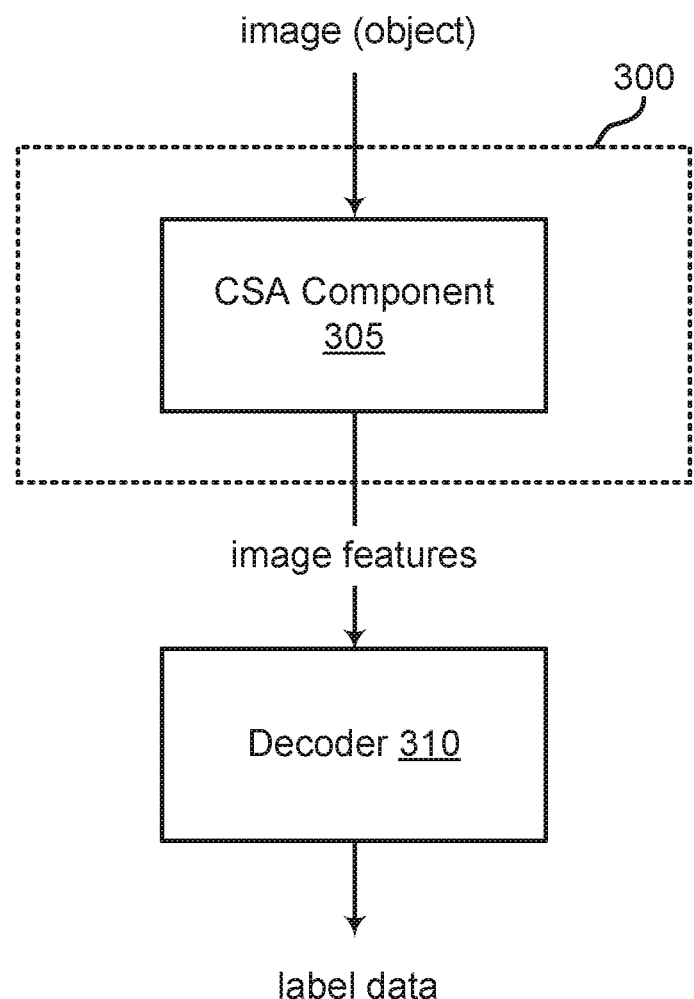
FIG. 3 shows an example of a machine learning model according to aspects of the present disclosure.

FIG. 3 shows an example of a machine learning model according to aspects of the present disclosure. The example shown includes encoder 300 and decoder 310. Encoder 300 is an example of, or includes aspects of, the corresponding element described with reference to FIG. 2. In one embodiment, encoder 300 includes convolutional self-attention (CSA) component 305. In some examples, encoder 300 may include an optional recursive atrous self-attention (RASA) component. Decoder 310 is an example of, or includes aspects of, the corresponding element described with reference to FIG. 2.

According to some embodiments, CSA component 305 calculates an attention weight for a set of relative positions corresponding to the position of the sliding window. In some examples, CSA component 305 multiplies the attention weight by a product of the convolutional kernel and values corresponding to the sliding window to obtain one of the set of attention-weighted values. In some examples, CSA component 305 identifies a query matrix and a key matrix, where the attention weight is calculated based on the query matrix and the key matrix. In some examples, CSA component 305 performs an outlook attention operation, where the attention weight is calculated based on the outlook attention operation. CSA component 305 is an example of, or includes aspects of, the corresponding element described with reference to FIGS. 4 and 5.

According to some embodiments, an optional RASA component performs a recursive atrous self-attention operation based on an output of the convolutional self-attention operation to obtain the image features. In some examples, the RASA component performs a recursive atrous self-attention operation by recursively performing the atrous self-attention operation, where the image features are generated based on the recursive atrous self-attention operation.

Referring to FIG. 3, according to an embodiment, encoder 300 takes an image depicting an object as input. Encoder 300 generates image features for the image by performing a convolutional self-attention operation via CSA component 305. The image features are then input to decoder 310, which generates label data.

FIG. 4 shows an example of a transformer model 400 according to aspects of the present disclosure. Machine learning model 225 as shown in FIG. 3 includes transformer model 400. The example shown includes transformer model 400, CSA component 405, and RASA component 410. CSA component 405 is an example of, or includes aspects of, the corresponding element described with reference to FIGS. 3 and 5. RASA component 410 is an example of, or includes aspects of, the corresponding element described with reference to FIGS. 3 and 6. In FIG. 4, H, W represents the height and width of an image. C is the feature channel. The output resolution of components/modules is shown in FIG. 4. In some cases, CSA component 405 may be referred to as a CSA transformer block. RASA component 410 may be referred to as a RASA transformer block. RASA component 410 is optional. That is, in some embodiments of the present disclosure, transformer model 400 may not include RASA component 410.

According to an embodiment, stages of transformer model 400 perform a down-sampling operation. Their output resolutions are from stride-4 to stride-32, gradually. Transformer model 400 has a limited number of parameters and two self-attention layers. In some examples, the self-attention layers include a convolutional self-attention layer and a recursive atrous self-attention layer. In some examples, the convolutional self-attention layer includes a 3×3 sliding kernel and is adopted in the first stage. The recursive atrous self-attention layer has a global kernel and is adopted in the other three stages.

According to an embodiment, transformer model 400 comprises four-stage components. In some examples, four overlapped patch embedding layers are used. The first layer down-samples the image into stride-4 resolution. The other three layers down-sample the feature maps to the resolution of stride-8, stride-16, and stride-32, respectively. Each of the four stages comprises a transformer block.

According to an embodiment, transformer model 400 partitions an image into a set of patches, wherein the image features are generated based on the set of patches. Transformer model 400 performs a patch merging operation on the set of patches to obtain a set of merged patches, wherein the image features are generated based on the set of merged patches.

According to an embodiment, transformer model 400 includes CSA component 405 (i.e., first stage) configured to process low-level image features, and RASA components 410 (second, third, and fourth stages) configured to process high-level image features. That is, CSA is embedded in the first stage and RASA is embedded in the other stages. CSA component 405 is further described in FIG. 5. RASA components 410 is further described in FIG. 6. A transformer block includes a self-attention layer and a multi-layer perceptron (MLP) layer. The layers are enhanced self-attention layers that process local and global features in LVT.

An MLP is a feed forward neural network that typically consists of multiple layers of perceptrons. Each perceptron layer may include an input layer, one or more hidden layers, and an output layer. Each node may include a non-linear activation function. An MLP may be trained using backpropagation (i.e., computing the gradient of the loss function with respect to the parameters).

Figure 5:
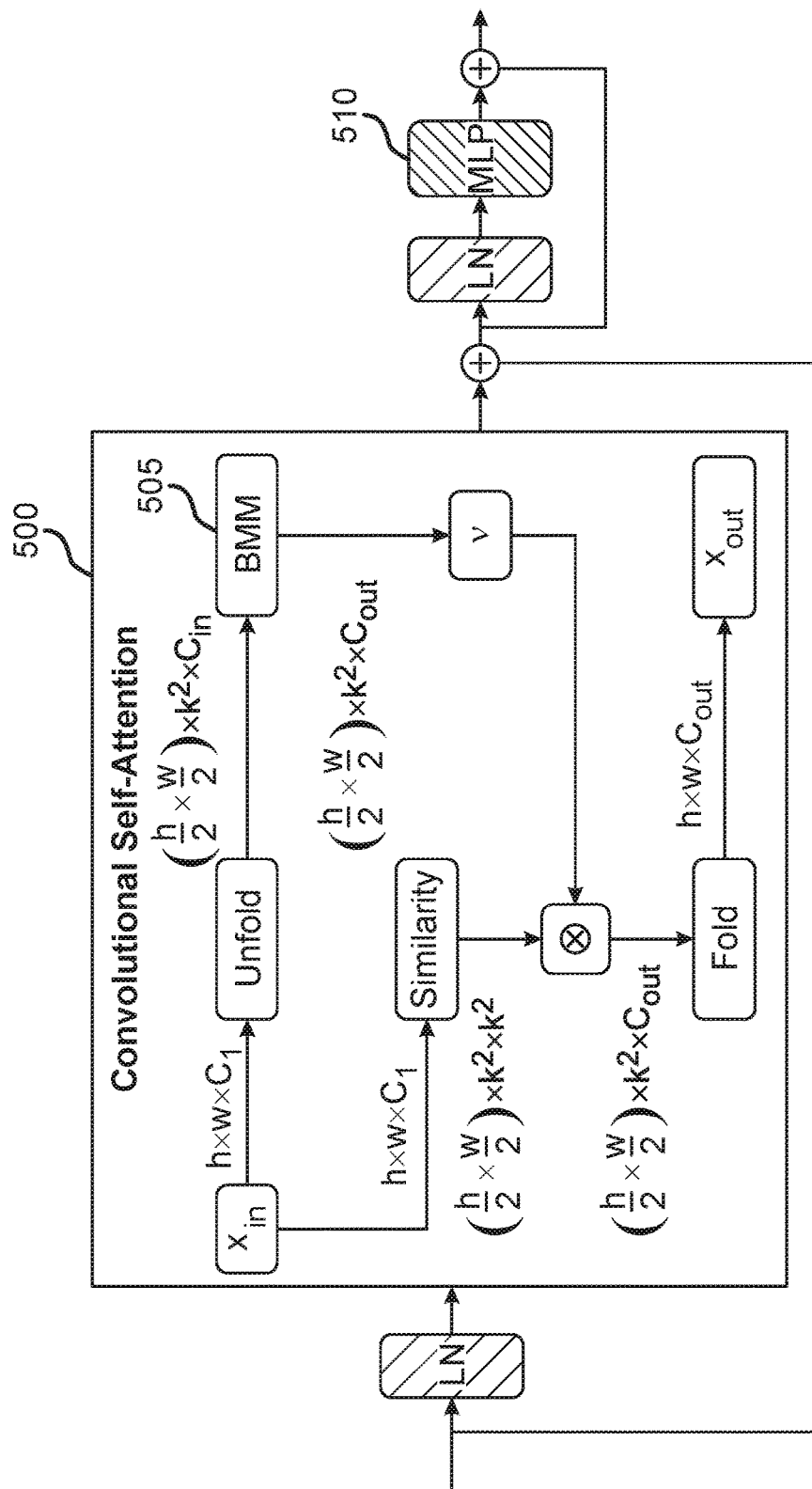
FIG. 5 shows an example of a convolutional self-attention (CSA) component according to aspects of the present disclosure.

FIG. 5 shows an example of a convolutional self-attention (CSA) component according to aspects of the present disclosure. The example shown includes CSA component 500, batched matrix multiplication 505, and multi-layer perceptron 510. In FIG. 5, H, W represents the height and width of the image. C is the feature channel. The output resolution of components/modules is shown. Both the Unfold and Fold operations have a stride of 2. BMM stands for batched matrix multiplication, which corresponds to $W_{i \to j} x_j$ in Equation (1) with the batch dimension being the number of spatial locations in a local window. LN denotes layer normalization.

The self-attention layer uses the global receptive field in feature extraction. In some cases, the machine learning model performs convolution in the early stage because the locality contributes more when it comes to process low-level features. A window-based self-attention layer is implemented that has a 3×3 kernel and incorporates the representation of convolution.

In some embodiments, let x, y∈ $\mathbb{R}^d$ be the input and output feature vectors where d represents the channel number. Let i,j∈ $\mathbb{R}$ index the spatial locations. Convolution is computed by sliding windows. The convolution in a window is formulated as:

$$y_i = \sum_{j \in N(i)} W_{i \to j} x_j \quad (1)$$

where N(i) represents the spatial locations in the local neighborhood that is defined by the kernel centered at location i. IN(i) I=k×k where k is the kernel size. i→j represents the relative spatial relationship from i to j. $W_{i \to j} \in \mathbb{R}^{d \times d}$ is the projection matrix. In total, there are |N(i)|Ws in a kernel. A 3×3 kernel comprises 9 such matrices Ws.

In some examples, self-attention depends on projection matrices $W_q$, $W_k$, $W_v \in \mathbb{R}^{d \times d}$ to compute query, key and value. In some cases, sliding window based self-attention is implemented. The self-attention in a window is formulated as:

$$y_i = \sum_{j \in N(i)} \alpha_{i \to j} W_v x_j \quad (2)$$

$$\alpha_{i \to j} = \frac{e^{(W_q x_i)^T W_k x_j}}{\sum_{z \in N(i)} e^{(W_q x_i)^T W_k x_z}}$$

where $\alpha_{i \to j} \in (0, 1)$ is a scalar that controls the contribution of the value in each spatial location in the summation. α is normalized by softmax operation such that $\Sigma_j \alpha_{i \to j}=1$. Compared with convolution with the same kernel size k, the number of learnable matrices is three rather than $k^2$. Outlook attention is used to predict a instead of calculating by the dot product of query and key. The calculation is formulated as:

$$\alpha_{i \to j} = \frac{W_{qk} x_i[j]}{\sum_{z \in N(i)} W_{qk} x_i[z]} \quad (3)$$

where $W_{qk} \in \mathbb{R}^{d \times k^2}$ and [j] means jth element of the vector.

CSA component 500 is configured to generate image features for an image by performing a convolutional self-attention (CSA) operation. The self-attention and convolution are generalized into a unified convolutional self-attention operation as follows:

$$y_i = \sum_{j \in N(i)} \alpha_{i \to j} W_{i \to j} x_j \quad (4)$$

In some examples, self-attention and CSA have the output of size k×k for a local window. When $\alpha_{i \to j}=1$ where the weights are the same, CSA is the convolution for the output center. When $W_{i \to j}=W_v$ where the projection matrices are the same, CSA is equivalent to self-attention. The dynamic α predicted by the input is used. CSA has an increased capacity than outlook attention operation. Additionally, CSA component 500 has an input-dependent kernel, a learnable filter, and is configured for strong representation capability in the first stage of vision transformers.

CSA component 500 is an example of, or includes aspects of, the corresponding element described with reference to FIGS. 3 and 4. Multi-layer perceptron 510 is an example of, or includes aspects of, the corresponding element described with reference to FIG. 6.

Figure 6:
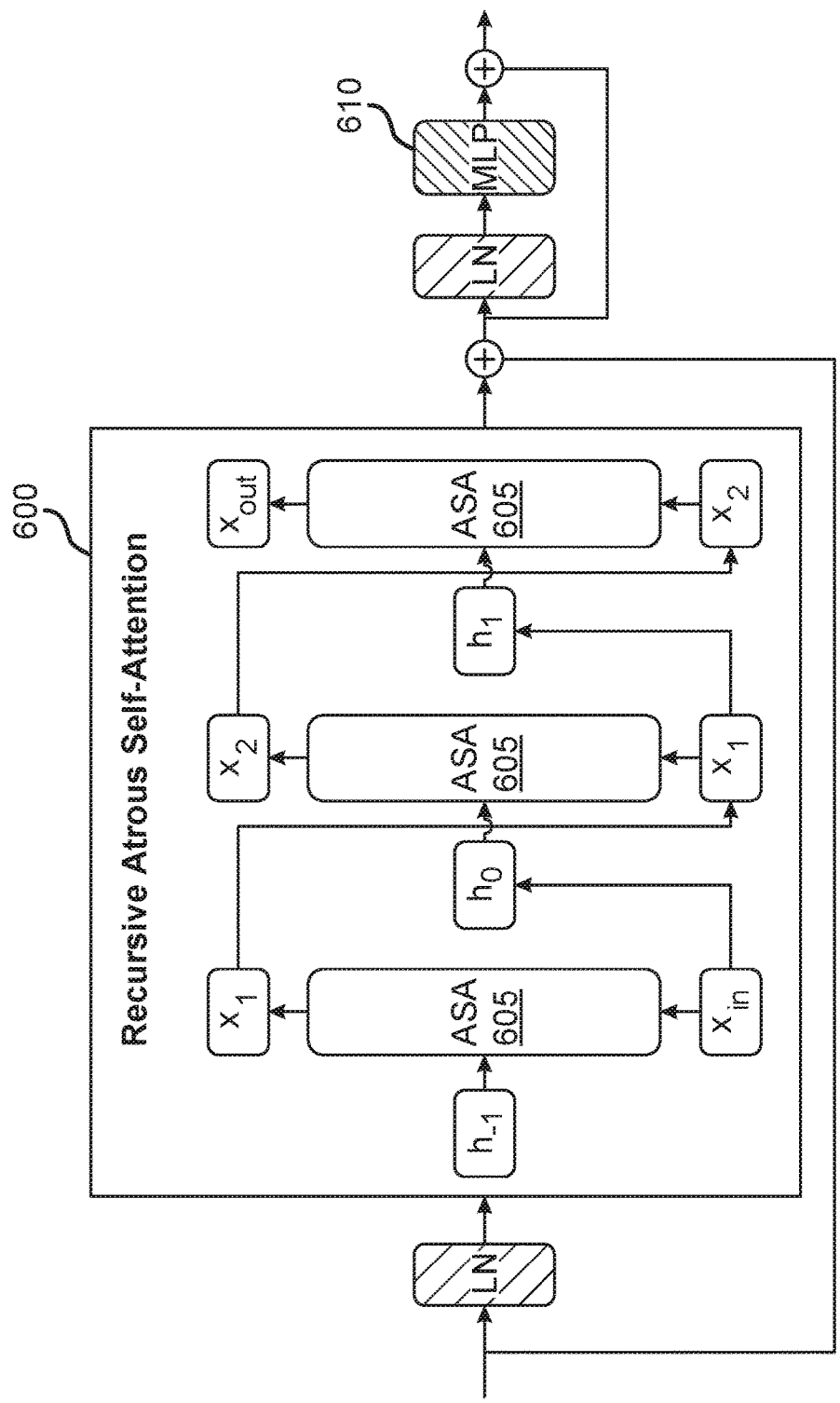
FIG. 6 shows an example of a recursive atrous self-attention (RASA) component according to aspects of the present disclosure.

FIG. 6 shows an example of a recursive atrous self-attention (RASA) component according to aspects of the present disclosure. The example shown includes RASA component 600, atrous self-attention component 605, and multi-layer perceptron 610. ASA is short for atrous self-attention. RASA component 600 is configured to perform atrous self-attention (ASA) recursively. Multi-scale features are used in detecting or segmenting the objects. Atrous convolution is used to capture the multi-scale context with the same amount of parameters as conventional convolution. RASA component 600 is configured for weights sharing atrous convolution. In some cases, the feature response of self-attention is a weighted sum of the projected input vectors from all spatial locations. The weights are determined by the similarities between the queries and keys, and represent the strength of the relationship among a pair of feature vectors. Thus, multi-scale information is added when generating the weights. the calculation of the query is changed from a 1×1 convolution to the following operation:

$$Q = \sum_{r \in \{1,3,5\}} SiLU(Conv(\hat{Q}, W_q^{k=3}, r, g = d)) \quad (5)$$

where $$\hat{Q} = Conv(X, W_q^{k=1}, r = 1, g = 1) \quad (6)$$

$$SiLU(m) = m \odot sigmoid(m) \quad (7)$$

X, Q∈ $\mathbb{R}^{d \times H \times W}$ are the feature maps, and $W_q^k \in \mathbb{R}^{k^2 d \times d/g}$ is the kernel weight. H, W are the spatial dimensions. d is the feature channels. k, r and g represent the kernel size, dilation rate, and group number of the convolution. The 1×1 convolution is used to apply linear projection. Next, three convolutions are applied that have different dilation rates and a shared kernel to capture the multi-scale contexts. The parameter cost is further reduced by setting the group number equal to the feature channel number. Then, the parallel features of different scales are weighted summed. A self-calibration mechanism is used to determine the weights for each scale by the corresponding activation strength using the SiLU. The similarity calculation of the query and key between a pair of spatial locations in self-attention uses the multi-scale information.

Recursive atrous self-attention increases the depths for the machine learning model without increasing the number of model parameters. In some examples, recursive methods may be used in vision tasks employing convolutional neural networks (CNNs). Recursive method for self-attention may also be used. In some examples, the machine learning model includes recurrent networks. According to an embodiment of the present disclosure, the machine learning model includes recursive atrous self-attention, which is formulated as follows:

$$x_{t+1} = ASA(F(X_t, h_{t-1}))$$

$$h_{t-1} = X_{t-1}$$

$$X_t = ASA(F(X_{t-1}, h_{t-2})) \quad (8)$$

where t is the step and $h \in \mathbb{R}^{d \times H \times W}$ the hidden state. ASA is used as the non-linear activation function. The initial hidden state $h_{-1} = 0$. $F(X, h) = W_F X + U_F h$ is the linear function combining the input and hidden state. $W_F$, $U_F$ are the projection weights. The setting $W_F = 1$, $U_F = 1$ provides high performance and avoids having extra parameters. The recursion depth is set as 2 to manage computation cost.

RASA component 600 is an example of, or includes aspects of, the corresponding element described with reference to FIGS. 3 and 4. Multi-layer perceptron 610 is an example of, or includes aspects of, the corresponding element described with reference to FIG. 5.

Image Segmentation

In FIGS. 7-10, a method, apparatus, and non-transitory computer readable medium for image segmentation are described. One or more embodiments of the method, apparatus, and non-transitory computer readable medium include receiving an image depicting an object; generating image features for the image by performing a convolutional self-attention operation that outputs a plurality of attention-weighted values for a convolutional kernel applied at a position of a sliding window on the image; and generating label data that identifies the object based on the image features.

Some examples of the method, apparatus, and non-transitory computer readable medium further include partitioning the image into a plurality of patches, wherein the image features are generated based on the plurality of patches.

Some examples of the method, apparatus, and non-transitory computer readable medium further include performing a patch merging operation on the plurality of patches to obtain a plurality of merged patches, wherein the image features are generated based on the plurality of merged patches.

Some examples of the method, apparatus, and non-transitory computer readable medium further include calculating an attention weight for each of a plurality of relative positions corresponding to the position of the sliding window. Some examples further include multiplying the attention weight by a product of the convolutional kernel and values corresponding to the sliding window to obtain one of the plurality of attention-weighted values.

Some examples of the method, apparatus, and non-transitory computer readable medium further include identifying a query matrix and a key matrix, wherein the attention weight is calculated based on the query matrix and the key matrix.

Some examples of the method, apparatus, and non-transitory computer readable medium further include performing an outlook attention operation, wherein the attention weight is calculated based on the outlook attention operation.

Some examples of the method, apparatus, and non-transitory computer readable medium further include performing a recursive atrous self-attention operation based on an output of the convolutional self-attention operation to obtain the image features.

Some examples of the method, apparatus, and non-transitory computer readable medium further include decoding the image features to obtain panoptic segmentation data, wherein the label data includes the panoptic segmentation data.

Some examples of the method, apparatus, and non-transitory computer readable medium further include displaying the image together with an image overlay including the panoptic segmentation data.

Some examples of the method, apparatus, and non-transitory computer readable medium further include applying an edit to the image based on the panoptic segmentation data.

Figure 7:
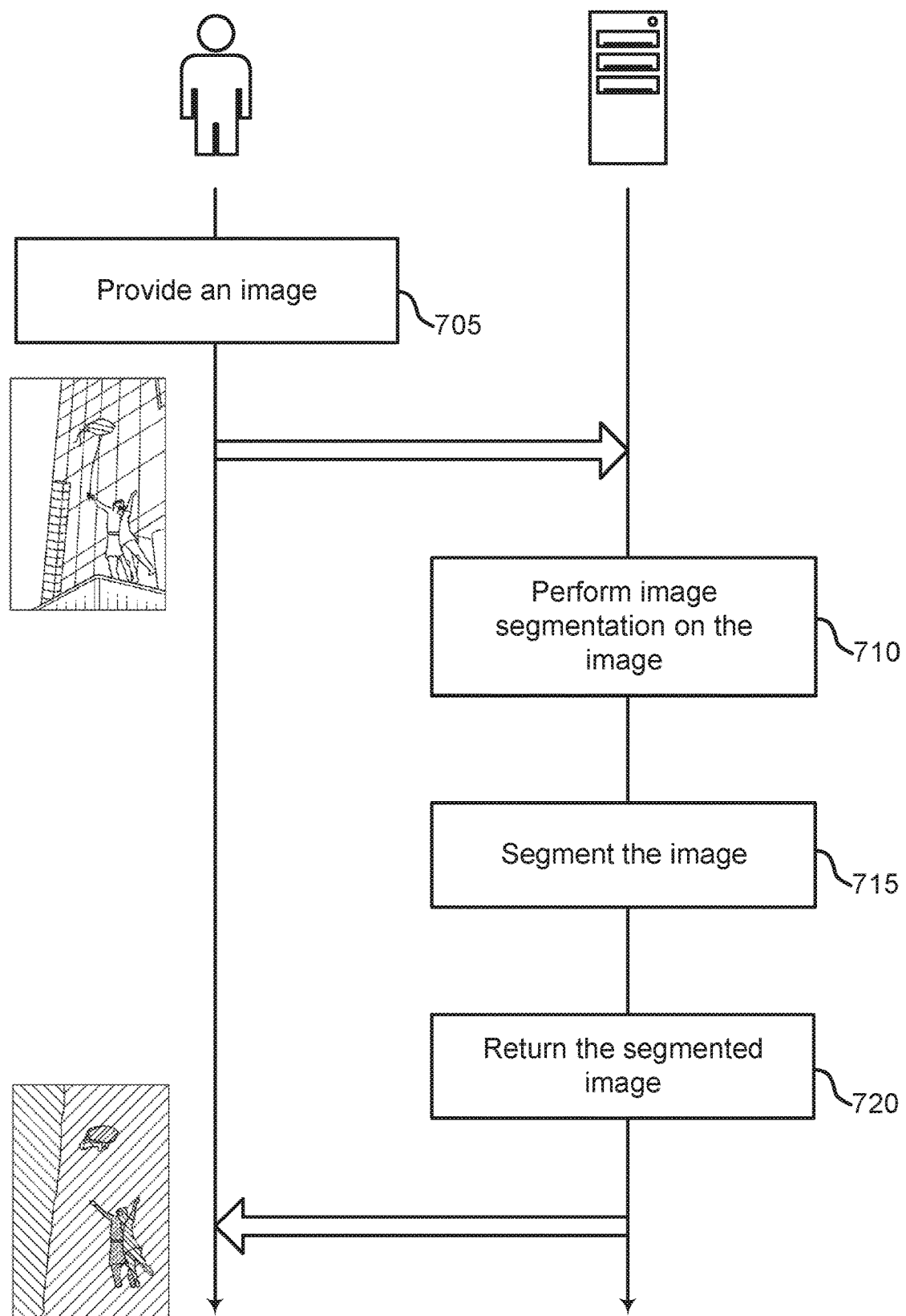
FIG. 7 shows an example of image segmentation according to aspects of the present disclosure.

FIG. 7 shows an example of image segmentation according to aspects of the present disclosure. Image segmentation apparatus 200 as shown in FIG. 2 performs image segmentation on an image during inference. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the user provides an image. In some cases, the operations of this step refer to, or may be performed by, a user as described with reference to FIG. 1. For example, an image includes a set of objects that are of the same or different classes. The image depicts two persons flying a kite in front of a tall building. The image is transmitted to an image segmentation apparatus for visual information interpretation.

At operation 710, the system performs image segmentation on the image. In some cases, the operations of this step refer to, or may be performed by, an image segmentation apparatus as described with reference to FIGS. 1, 2, and 8. In some examples, an image segmentation apparatus performs object detection and instance segmentation. The image segmentation apparatus classifies objects using categorical labels and localizes objects present in input images (i.e., object detection). The image segmentation apparatus also performs semantic segmentation by assigning categories (e.g., vehicle, animal, etc.) to pixels of an image. Instance segmentation refines semantic segmentation by detecting the instances of each category. For example, the instances of class "person" may be identified.

At operation 715, the system segments the image based on the image segmentation. In some cases, the operations of this step refer to, or may be performed by, an image segmentation apparatus as described with reference to FIGS. 1, 2, and 8. In the above example, a first person is labeled with a first shading pattern while a second person is labeled with a second shading pattern. The image segmentation apparatus also segments the building and sky of the image and labels them accordingly.

At operation 720, the system returns the segmented image to the user. In some cases, the operations of this step refer to, or may be performed by, an image segmentation apparatus as described with reference to FIGS. 1, 2, and 8.

Figure 8:
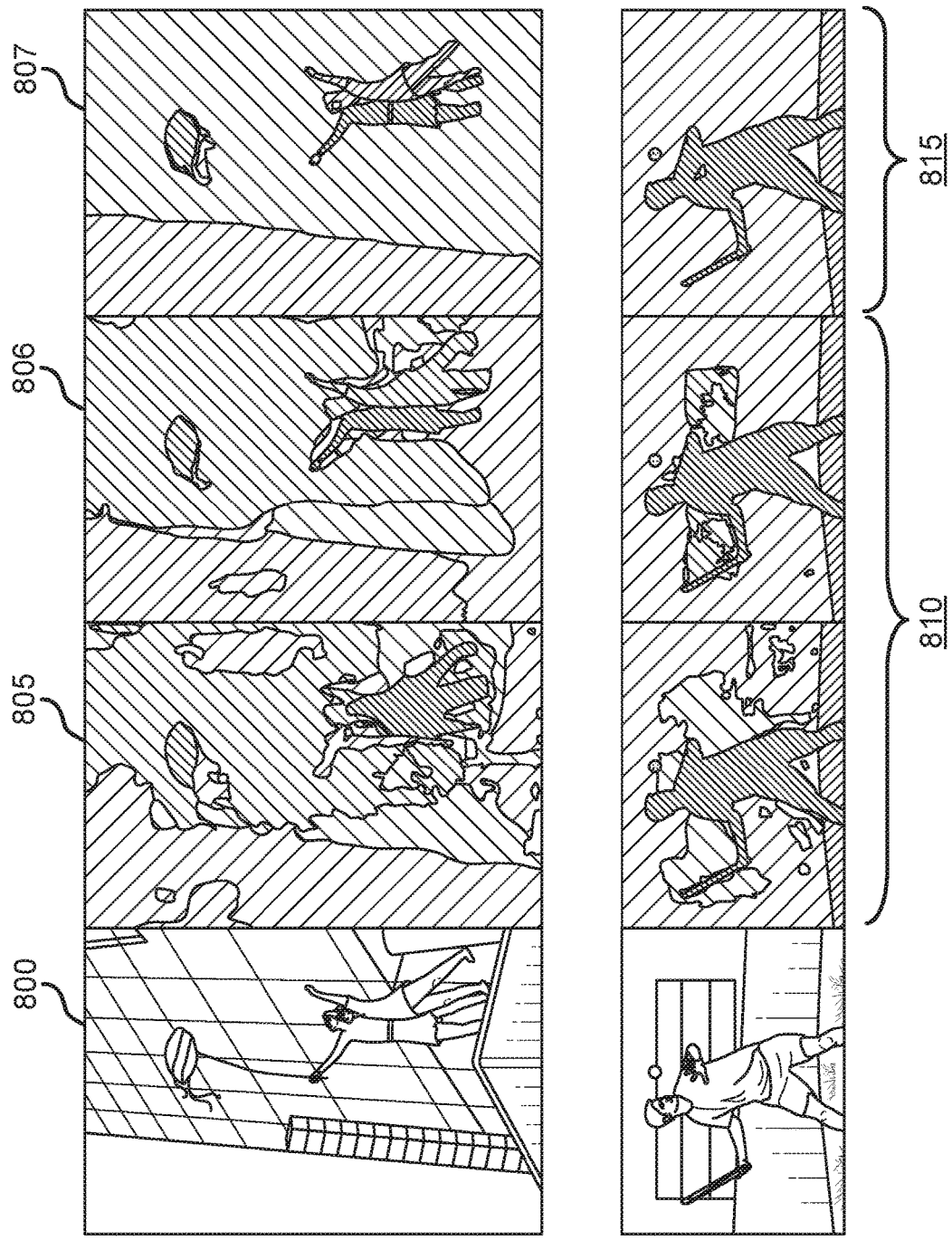
FIG. 8 shows an example of panoptic segmentation according to aspects of the present disclosure.

FIG. 8 shows an example of panoptic segmentation according to aspects of the present disclosure. The example shown includes image 800, first segmented image 805, second segmented image 806, third segmented image 807, conventional image segmentation system 810, and image segmentation apparatus 815. Segmented image 805 is an example of, or includes aspects of, the corresponding element described with reference to FIG. 1. Image segmentation apparatus 815 is an example of, or includes aspects of, the corresponding element described with reference to FIGS. 1 and 2. In some examples, conventional image segmentation system 810 generates first segmented image 805 and second segmented image 806. Image segmentation apparatus 815 generates third segmented image 807.

In some examples, image segmentation apparatus 815 is trained on Mobile COCO dataset for panoptic segmentation. At inference, image segmentation apparatus 815 recognizes, localizes, and segments objects and stuffs at the same time. Machine learning model 225 has less than 5.5 M parameters. Encoder architecture of image segmentation apparatus 815 is different from conventional image segmentation system 810. As shown in FIG. 8, accuracy and coherency of the labels from image segmentation apparatus 815 are increased. On the first row, image segmentation apparatus 815 can clearly identify the two instances of object class person. First segmented image 805 incorrectly captures the boundary of the two persons. Second segmented image 806 incorrectly recognizes objects that do not belong to class person (e.g., the shading area is not in the shape of the two persons as in image 800).

Figure 9:
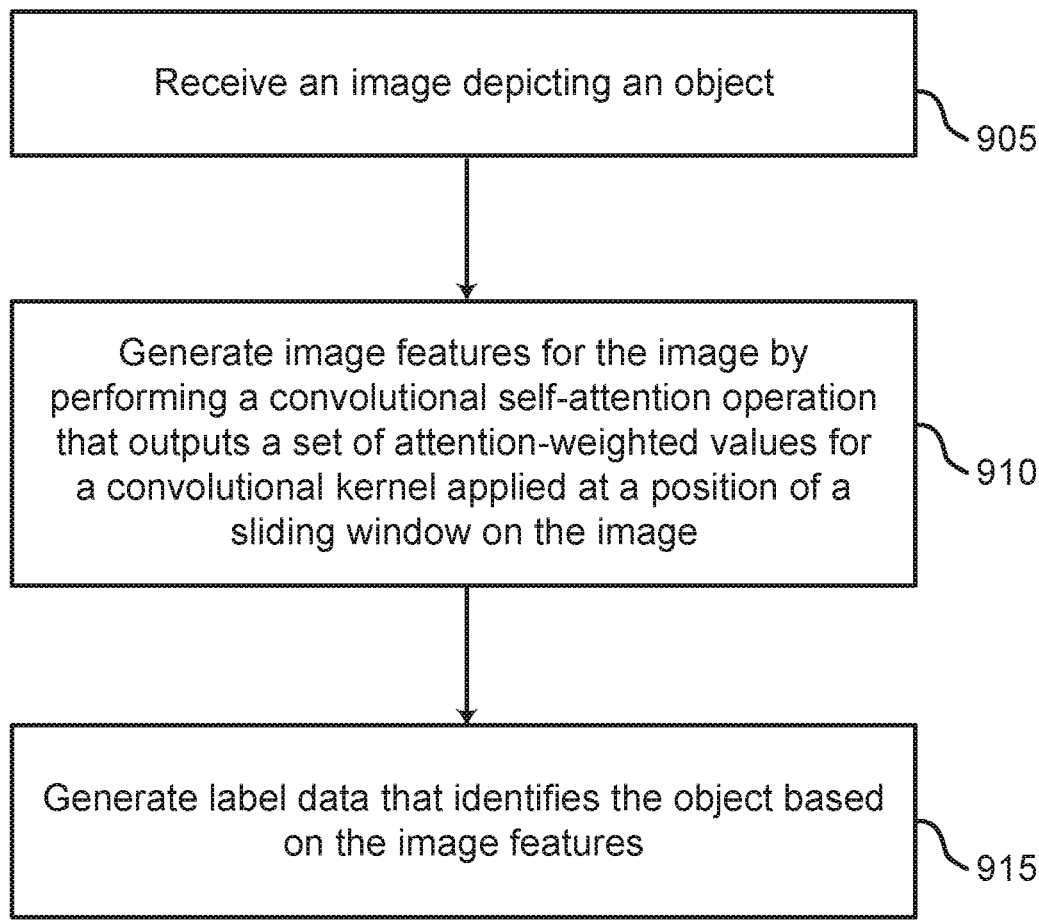
FIG. 9 shows an example of a method for image processing involving a convolutional self-attention operation according to aspects of the present disclosure.

FIG. 9 shows an example of a method for image processing involving a convolutional self-attention operation according to aspects of the present disclosure. In some examples, these operations are performed by a system including a processor executing a set of codes to control functional elements of an apparatus (i.e., image segmentation apparatus 200). Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives an image depicting an object. The input image may be selected and uploaded by a user, e.g., via user device 105. In some cases, the operations of this step refer to, or may be performed by, a machine learning model as described with reference to FIG. 2.

At operation 910, the system generates image features for the image by performing a convolutional self-attention operation that outputs a set of attention-weighted values for a convolutional kernel applied at a position of a sliding window on the image. In some cases, the operations of this step refer to, or may be performed by, an encoder as described with reference to FIGS. 2 and 3. Convolutional self-attention operation introduces local self-attention into the convolution within a kernel of size 3×3 to enrich low-level features in a first stage of transformer model 400 as shown in FIG. 4.

In some embodiments, the encoder includes a convolutional self-attention transformer block. The self-attention layers capture short-range and long-range visual dependencies. The convolution layer is used to process low-level features. The convolutional self-attention transformer block includes local self-attention that is incorporated into convolution within the kernel. For example, the kernel is of size 3×3. Convolutional self-attention has high generalization ability as it enriches the low-level features. Hence, machine learning model 225 generates coherent labels in local regions.

Some examples of the method, apparatus, and non-transitory computer readable medium further include calculating an attention weight for each of a plurality of relative positions corresponding to the position of the sliding window. Some examples further include multiplying the attention weight by a product of the convolutional kernel and values corresponding to the sliding window to obtain one of the plurality of attention-weighted values.

Some examples of the method, apparatus, and non-transitory computer readable medium further include identifying a query matrix and a key matrix, wherein the attention weight is calculated based on the query matrix and the key matrix.

At operation 915, the system generates label data that identifies the object based on the image features. In some cases, the operations of this step refer to, or may be performed by, a decoder as described with reference to FIGS. 2 and 3. In some examples, an image decoder is configured to decode the image features to obtain panoptic segmentation data, where the label data includes the panoptic segmentation data. The image segmentation apparatus displays the image together with an image overlay including the panoptic segmentation data. A user, e.g., via an image editing application, applies an edit to the image based on the panoptic segmentation data.

Figure 10:
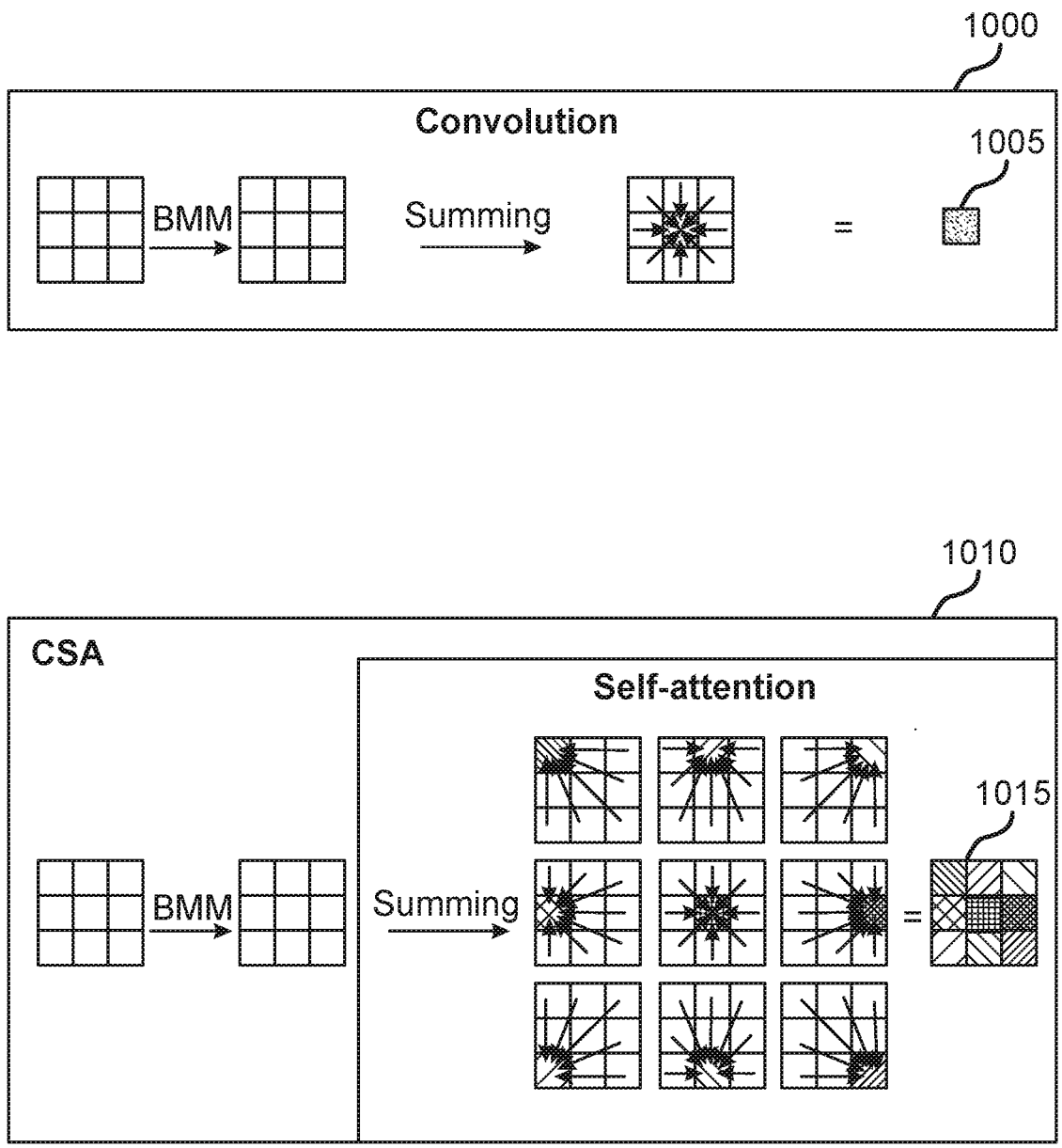
FIG. 10 shows an example of a convolutional self-attention operation according to aspects of the present disclosure.

FIG. 10 shows an example of a convolutional self-attention operation according to aspects of the present disclosure. The example shown includes convolution 1000, convolution output 1005, CSA 1010, and CSA output 1015. FIG. 10 illustrates convolutional self-attention of the present disclosure in a 3×3 local window, as an example. The outputs of convolution and CSA are 1×1 and 3×3, respectively. Mathematically, convolution 1000 comprises two procedures, i.e., batched matrix multiplication (BMM) and summation. BMM corresponds to $W_{i \to j} x_j$ in Equation (1) with the batch dimension being the number of spatial locations. CSA has the BMM operation and has the same summation process as self-attention. CSA 1010 performs 9 different input-dependent summations with weights a in Equation (2), where CSA process is shown using arrows and patches. CSA 1010 contains both the learnable filter and dynamic kernel.

In some examples, convolution 1000 receives input size 3×3, kernel size 3×3, and convolution output 1005 is a single value. That is, convolution 1000 assigns a summed value to a center (i.e., center of the 3×3). In image processing, convolution 1000 is the process of transforming an image by applying a kernel over each pixel and its local neighbors across the entire image. A kernel is a matrix of values whose size and values determine the transformation effect of the convolution process. Convolution 1000 involves following steps. Convolution 1000 places a kernel matrix over each pixel of an image (ensuring that the kernel is within the image). Then, convolution 1000 multiplies each value of the kernel with the corresponding pixel it is over. Convolution 1000 sums the resulting multiplied values and returns the resulting value as the new value of the center pixel. Convolution 1000 is repeated across the entire image. In some examples, center element of the kernel is placed over the source pixel. The source pixel is then replaced with a weighted sum of itself and nearby pixels.

In some examples, CSA 1010 receives input size 3×3 and CSA output 1015 is also 3×3 (e.g., 3×3 matrix). CSA 1010 updates 9 numbers based on neighboring values at each position of a window. That is, CSA 1010 performs 9 multiplications and adds them up to update a position (e.g., upper left corner). Note in FIG. 10, each position of the sliding window using CSA 1010 is represented by a different shading pattern.

Training and Evaluation

Figure 11:
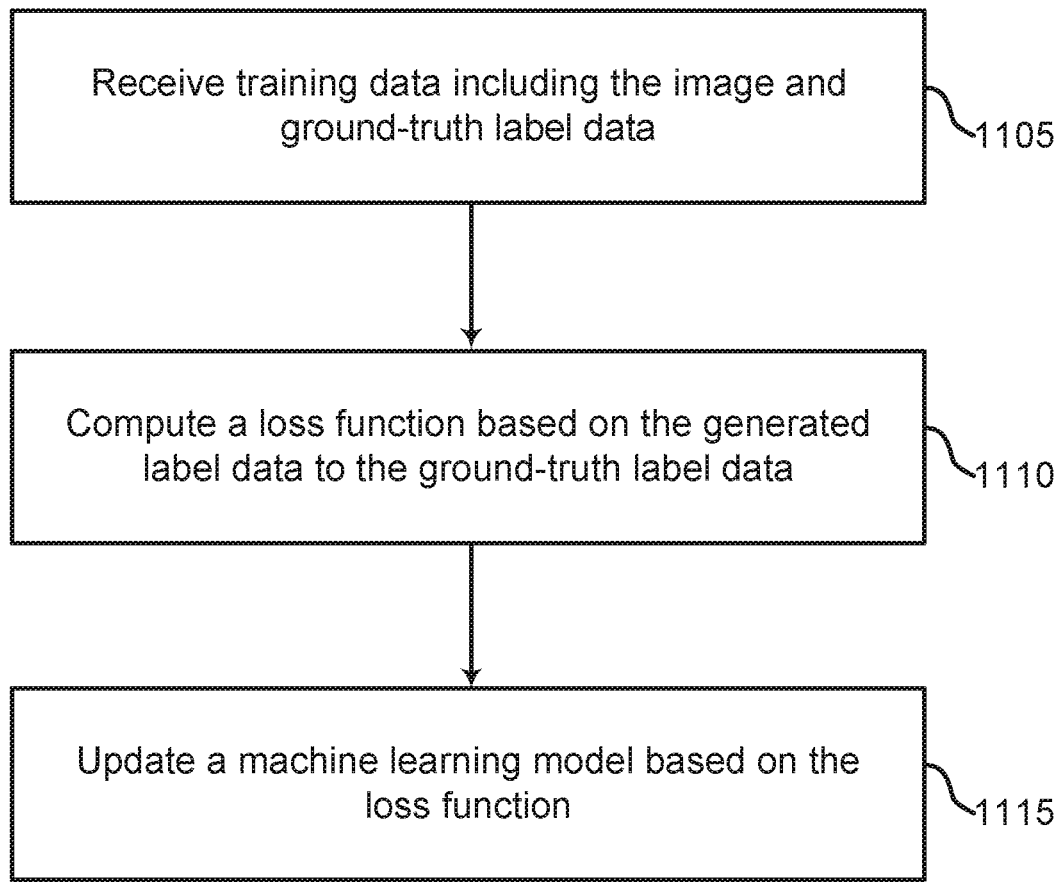
FIG. 11 shows an example of a method for training a machine learning model according to aspects of the present disclosure.

In FIG. 11, a method, apparatus, and non-transitory computer readable medium for image segmentation are described. One or more embodiments of the method, apparatus, and non-transitory computer readable medium include receiving training data including a training image and ground-truth label data; generating image features for the training image by performing a convolutional self-attention operation using a machine learning model, wherein the machine learning model generates a plurality of attention-weighted values for a convolutional kernel applied at a position of a sliding window on the training image; generating label data that identifies an object in the training image based on the image features; computing a loss function based on the generated label data and the ground-truth label data; and updating the machine learning model based on the loss function.

Some examples of the method, apparatus, and non-transitory computer readable medium further include receiving an image. Some examples further include generating panoptic segmentation data for the image using the machine learning model.

Some examples of the method, apparatus, and non-transitory computer readable medium further include partitioning the training image into a plurality of patches. Some examples further include performing a patch merging operation on the plurality of patches to obtain a plurality of merged patches, wherein the image features are generated based on the plurality of merged patches.

Some examples of the method, apparatus, and non-transitory computer readable medium further include calculating an attention weight for each of a plurality of relative positions corresponding to the position of the sliding window. Some examples further include multiplying the attention weight by a product of the convolutional kernel and values corresponding to the sliding window to obtain one of the plurality of attention-weighted values.

Some examples of the method, apparatus, and non-transitory computer readable medium further include identifying a query matrix and a key matrix. Some examples further include performing an outlook attention operation, wherein the attention weight is calculated based on the query matrix, the key matrix, and the outlook attention operation.

Some examples of the method, apparatus, and non-transitory computer readable medium further include performing a recursive atrous self-attention operation based on an output of the convolutional self-attention operation to obtain the image features.

FIG. 11 shows an example of a method for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during a training process, the parameters and weights of machine learning model 225 are adjusted to increase the accuracy of the result (e.g., attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1105, the system receives training data including the image and ground-truth label data. In some cases, the operations of this step refer to, or may be performed by, a training component as described with reference to FIG. 2.

At operation 1110, the system computes a loss function based on the generated label data to the ground-truth label data. In some cases, the operations of this step refer to, or may be performed by, a training component as described with reference to FIG. 2.

The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

At operation 1115, the system updates a machine learning model based on the loss function. In some cases, the operations of this step refer to, or may be performed by, a training component as described with reference to FIG. 2.

Performance of apparatus, systems and methods of the present disclosure have been evaluated, and results indicate embodiments of the present disclosure have obtained increased performance over existing technology. Example experiments demonstrate that the image segmentation apparatus outperforms conventional systems.

Some example experiments relate to image recognition on ILSVRC2012, a subset of the ImageNet database. The training and validation sets contain 1.3 M and 50K images, respectively. There are 1000 object categories in total. The classes are distributed approximately and uniformly in the training and validation sets.

The training setting uses AdamW as the optimizer. The learning rate is scaled based on the batch size with the formula being $$lr = \frac{\text{batch size}}{1024} \times \text{lr\_base}.$$

In some examples, lr_base is set to $1.6 \times 10^{-3}$. The weight decay of $5 \times 10^{-2}$ is adopted. Stochastic depth with drop path rate being 0.1 is employed. In total, there are 300 training epochs. Some examples use CutOut, RandAug, and Token Labeling as the data augmentation methods. Class attention layer is used as the post stage. the input resolution is 224×224 in the training phase and testing phase.

The encoder size is less than 3.5 M. To compare image segmentation apparatus 200 with other network models, some examples scale image segmentation apparatus 200 to the size of ResNet50, a backbone of vision models. Image segmentation apparatus 200 shows increased performance for image processing tasks such as visual recognition, semantic segmentation, panoptic segmentation, etc.

Some example experiments relate to semantic segmentation task performed on ADE20K dataset. There are 150 categories in total, including 35 stuff classes and 115 discrete objects. The training and validation sets contain 20,210 and 2,000 images, respectively.

Some examples adopt the Segformer framework and use a MLP decoder. The encoder of image segmentation apparatus 200 is pre-trained on ImageNet-1K without extra data. The decoder is trained from scratch. The AdamW optimizer with the initial learning rate of $6 \times 10^{-5}$ is used. The weight decay is set to $1 \times 10^{-2}$. The poly learning rate schedule with power being 1 is employed. There are 160K training iterations in total and the batch size is 16. For data augmentation, we randomly resize the image with ratio 0.5 to 2.0 and then perform random cropping of size 512×512. Horizontal flipping with probability 0.5 is applied. During evaluation, single-scale test is performed.

The floating point operations per second (FLOPS) is calculated with the input resolution 512×512. The frames per second (FPS) is calculated on 2000 images on a single NVIDIA V100 GPU. During inference, the images are resized such that the short side is 512. Together with the decoder, the size of parameters is less than 4 M. Image segmentation apparatus 200 demonstrates increased performance for semantic segmentation.

Some example experiments perform panoptic segmentation on COCO dataset. The 2017 split is employed. It has 118K training images and 5K validation images. On average, an image of the COCO dataset contains 3.5 categories and 7.7 instances. Panoptic segmentation unifies object recognition, detection, localization, and segmentation at the same time.

The panoptic feature pyramid network (FPN) framework is adopted. The models are trained in this framework for comparisons. The mmdetection is the codebase. AdamW optimizer with initial learning rate $3 \times 10^{-4}$ is used. The weight decay is set to $1 \times 10^{-4}$. The 3×schedule is employed. There are 36 training epochs in total, the learning rate is decayed by 10 times after 24 and 33 epochs. Multi-scale training is used and during training, the images are randomly resized. The maximum length may not exceed 1333. The maximum allowable length of the short side is randomly sampled in the range of 640 to 800. Random horizontal flipping with probability 0.5 is applied. Single-scale testing is performed during testing.

The FLOPS is calculated on the input resolution 1200×800. During the inference, the images are resized such that the large side is not larger than 1333 and the short side is less than 800. The FLOPS are calculated on 2000 high-resolution images with a single NVIDIA V100 GPU. The machine learning model including the decoder has less than 5.5 M parameters. Image segmentation apparatus 200 demonstrates increased performance for mobile panoptic segmentation.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving an image depicting an object;
generating image features for the image by performing a convolutional self-attention (CSA) operation comprising a sum of a plurality of attention-weighted values, wherein each of the plurality of attention-weighted values comprises a multiplication of an attention weight, a convolutional kernel value, and an image value corresponding to a relative position with respect to a position of a sliding window; and
performing visual recognition processing on the image by decoding the image features to obtain panoptic segmentation data to generate label data that identifies the object based on the image features, wherein the label data includes the panoptic segmentation data.

2. The method of claim 1, further comprising:
partitioning the image into a plurality of patches, wherein the image features are generated based on the plurality of patches.

3. The method of claim 2, further comprising:
performing a patch merging operation on the plurality of patches to obtain a plurality of merged patches, wherein the image features are generated based on the plurality of merged patches.

4. The method of claim 1, further comprising:
calculating an attention weight for each of a plurality of relative positions corresponding to the position of the sliding window; and multiplying the attention weight by a product of the convolutional kernel value and values corresponding to the sliding window to obtain one of the plurality of attention-weighted values.

5. The method of claim 4, further comprising:
identifying a query matrix and a key matrix, wherein the attention weight is calculated based on the query matrix and the key matrix.

6. The method of claim 4, further comprising:
performing an outlook attention operation, wherein the attention weight is calculated based on the outlook attention operation.

7. The method of claim 1, further comprising:
performing a recursive atrous self-attention operation based on an output of the convolutional self-attention operation to obtain the image features.

8. The method of claim 1, further comprising:
displaying the image together with an image overlay including the panoptic segmentation data.

9. The method of claim 1, further comprising:
applying an edit to the image based on the panoptic segmentation data.

10. An apparatus comprising:
at least one processor; and
at least one memory including instructions that, when executed by the at least one processor, cause the at least one processor to perform operations comprising:
receiving an image depicting an object;
generating, using a convolutional self-attention transformer block of an encoder, image features for the image by performing a convolutional self-attention (CSA) operation comprising a sum of a plurality of attention-weighted values, wherein each of the plurality of attention-weighted values comprises a multiplication of an attention weight, a convolutional kernel value, and an image value corresponding to a relative position with respect to a position of a sliding window, wherein the generating comprises performing a recursive atrous self-attention operation based on an output of the CSA operation to obtain the image features; and
performing visual recognition processing on the image by generating label data that identifies the object of the image based on the image features.

11. The apparatus of claim 10, wherein the at least one processor is further configured to perform operations comprising:
receiving training data including the image and ground-truth label data, computing a loss function based on the generated label data and the ground-truth label data, and updating a machine learning model based on the loss function.

12. The apparatus of claim 10, wherein the at least one processor is further configured to perform operations comprising:
editing the image based on the label data.

13. A non-transitory computer readable medium storing code for image processing, the code comprising instructions that, when executed by at least one processor, cause the at least one processor to perform operations comprising:
receiving an image depicting an object;
generating image features for the image by performing a convolutional self-attention (CSA) operation comprising a sum of a plurality of attention-weighted values, wherein each of the plurality of attention-weighted values comprises a multiplication of an attention weight, a convolutional kernel value, and an image value corresponding to a relative position with respect to a position of a sliding window; and
performing visual recognition processing on the image by decoding the image features to obtain panoptic segmentation data to generate label data that identifies the object based on the image features, wherein the label data includes the panoptic segmentation data.

14. The non-transitory computer readable medium of claim 13, the code further comprising instructions executable by the at least one processor to perform operations comprising:
partitioning the image into a plurality of patches, wherein the image features are generated based on the plurality of patches.

15. The non-transitory computer readable medium of claim 14, the code further comprising instructions executable by the at least one processor to perform operations comprising:
performing a patch merging operation on the plurality of patches to obtain a plurality of merged patches, wherein the image features are generated based on the plurality of merged patches.

16. The non-transitory computer readable medium of claim 13, the code further comprising instructions executable by the at least one processor to perform operations comprising:
calculating an attention weight for each of a plurality of relative positions corresponding to the position of the sliding window; and
multiplying the attention weight by a product of the convolutional kernel value and values corresponding to the sliding window to obtain one of the plurality of attention-weighted values.

17. The non-transitory computer readable medium of claim 16, the code further comprising instructions executable by the at least one processor to perform operations comprising:
identifying a query matrix and a key matrix, wherein the attention weight is calculated based on the query matrix and the key matrix.

18. The non-transitory computer readable medium of claim 16, the code further comprising instructions executable by the at least one processor to perform operations comprising:
performing an outlook attention operation, wherein the attention weight is calculated based on the outlook attention operation.

* * * * *